United States Patent
Brignone et al.

(10) Patent No.: US 9,228,663 B2
(45) Date of Patent: Jan. 5, 2016

(54) DIVERTER VALVE DEVICE, IN PARTICULAR FOR A WASHING MACHINE, SUCH AS A DISHWASHER

(71) Applicant: ELBI INTERNATIONAL S.p.A., Turin (IT)

(72) Inventors: Enzo Brignone, Dronero (IT); Paolo Ravedati, Moncalieri (IT); Giovanni Giordano, Cuneo (IT); Pasqualino Caso, Venaria (IT)

(73) Assignee: ELBI INTERNATIONAL SPA, Turin (IT)

( * ) Notice: Subject to any disclaimer, the term of this patent is extended or adjusted under 35 U.S.C. 154(b) by 38 days.

(21) Appl. No.: 14/026,800

(22) Filed: Sep. 13, 2013

(65) Prior Publication Data

US 2014/0076439 A1    Mar. 20, 2014

(30) Foreign Application Priority Data

Sep. 14, 2012  (IT) .............................. TO2012A0793

(51) Int. Cl.
| | |
|---|---|
| *F16K 11/072* | (2006.01) |
| *F16K 11/07* | (2006.01) |
| *F16K 31/44* | (2006.01) |
| *A47L 15/22* | (2006.01) |
| *A47L 15/42* | (2006.01) |

(52) U.S. Cl.
CPC ................. *F16K 11/07* (2013.01); *A47L 15/22* (2013.01); *A47L 15/4221* (2013.01); *F16K 11/072* (2013.01); *F16K 31/44* (2013.01); *Y10T 137/86871* (2015.04)

(58) Field of Classification Search
CPC .......................... F16K 11/072; A47L 15/4221
USPC ..................................................... 137/625.46
See application file for complete search history.

(56) References Cited

U.S. PATENT DOCUMENTS

| 7,047,986 B2* | 5/2006 | Ertle et al. .................. 134/56 D |
| 7,100,623 B2* | 9/2006 | Assmann et al. ............. 134/184 |
| 7,225,488 B2* | 6/2007 | Wu .................................. 5/713 |

(Continued)

FOREIGN PATENT DOCUMENTS

| EP | 1 050 263 | 11/2000 |
| EP | 1 090 579 | 4/2001 |

(Continued)

OTHER PUBLICATIONS

Italian Search Report for IT Application No. 201220793 mailed Jun. 14, 2013 (8 pages).

*Primary Examiner* — John Fox
(74) *Attorney, Agent, or Firm* — Merchant & Gould P.C.

(57) ABSTRACT

A diverter valve device (10) including a body (12), in which a chamber (14) is defined, which is able to be flown through by a pressurized fluid flow; a rotatory plug (16), which is mounted on the body (12) and is adapted to rotate about a rotation axis (X-X); at least one inlet (18), which is provided in the body (12) and is fluidly arranged upstream of the chamber (14); and a pair of outlets (20a, 20b), which stem from the body (12) and are fluidly arranged downstream of the chamber (14). The body (12) has a substantially axial seat (22a) and a substantially radial seat (22b), which are fluidly arranged between the chamber (14) and one outlet (20a) and the other outlet (20b), respectively. The plug (16) is suited to assume a first and a second operating condition, in which it (16) respectively frees and obstructs the substantially axial seat (22a) as well as respectively obstructs and frees the substantially radial seat (22b).

16 Claims, 4 Drawing Sheets

(56) References Cited

U.S. PATENT DOCUMENTS 7,614,408 B2 * 11/2009 Park et al. .................. 134/56 D
8,282,741 B2 * 10/2012 Bertsch et al. ................. 134/18
2012/0097200 A1   4/2012 Fountain

FOREIGN PATENT DOCUMENTS

| EP | 1 264 570 | 12/2002 |
| EP | 1 502 535 | 2/2005 |
| EP | 2 283 764 | 2/2011 |

* cited by examiner

DIVERTER VALVE DEVICE, IN PARTICULAR FOR A WASHING MACHINE, SUCH AS A DISHWASHER

This application claims benefit of Serial No. TO 2012 A 000793, filed 14 Sep. 2012 in Italy and which application is incorporated herein by reference. To the extent appropriate, a claim of priority is made to the above disclosed application.

TECHNICAL FIELD

The present invention is relative to a diverter valve device, in particular for a washing machine, such as a dishwasher.

More in detail, the present invention is relative to a device that acts as a flow diverter, able to divide a fluid flow entering through at least one inlet leading to the device itself, thus distributing it among a plurality of outlets by means of the actuation of a plug organ, which obstructs and frees the outlets according to predetermined criteria.

In particular, a device of the type described above is used in the field of household appliances in order to selectively direct a fluid flow coming from an inlet towards a first outlet and a second outlet. For example, this type of device is often used as an alternate washing unit in dishwashers, since it allows a washing liquid flow coming from a supply apparatus (for example a hydraulic pump) to be selectively diverted towards a first outlet, which can be connected to an upper impeller that is suited to deliver the washing liquid to dishes arranged in an upper rack of the machine, and towards a second outlet, which can be connected to a lower impeller that is suited to deliver the washing liquid to dishes arranged in a lower rack of the machine. In this application, the plug is generally moved by means of actuator means, which, based on predetermined criteria, cause it to alternately obstruct the first outlet and the second outlet.

BACKGROUND

More precisely, the present invention is relative to a diverter valve device, namely a diverter valve device comprising:
- a valve body, in which a chamber is defined, which is able to be flown through by a pressurized fluid flow;
- a rotatory plug, which is mounted on said body and is adapted to rotate about a rotation axis;
- at least one inlet for said fluid flow, which is provided in said body and is fluidly arranged upstream of said chamber; and
- at least one pair of outlets for said fluid flow, which stem from said body and are fluidly arranged downstream of said chamber.

SUMMARY

The object of the present invention is to provide a diverter valve device, which is able to solve the drawbacks of the prior art and, in particular, can be manufactured in a simple and economic fashion.

According to the present invention, this and other objects are reached by means of a diverter valve device having the features set forth in the appended independent claim and, in particular, characterized in that said body has, furthermore, a substantially axial valve seat and a substantially radial valve seat, which are fluidly arranged between said chamber and one of said outlets and the other one of said outlets, respectively; said plug being suited to assume at least a first and a second operating condition, in which it respectively frees and obstructs said substantially axial valve seat as well as respectively obstructs and frees said substantially radial valve seat.

The appended claims are an integral part of the technical teaches provided in the following detailed description concerning the present invention. In particular, the dependent claims define some preferred embodiments of the present invention and describe advantageous and optional technical features.

BRIEF DESCRIPTION OF THE DRAWINGS

Further features and advantages of the present invention will be best understood upon perusal of the following detailed description, which is provided by way of example and is not limiting, with reference to the accompanying drawings, which specifically show what follows.

DETAILED DESCRIPTION OF THE INVENTION

With reference, in particular, to the figures from 1 to 3, number 10 indicates, as a whole, a diverter valve device manufactured according to a preferred embodiment of the present invention.

In the following description and in the appended claims, the terms "axial" and "radial" as well as the expressions deriving therefrom refer to the axis indicated with X-X in FIG. 3, so as to identify directions and orientations taken on by elements and components of device 10.

Particularly but not exclusively, device 10 is adapted to be used in a washing machine, such as a dishwasher.

Figure 1:
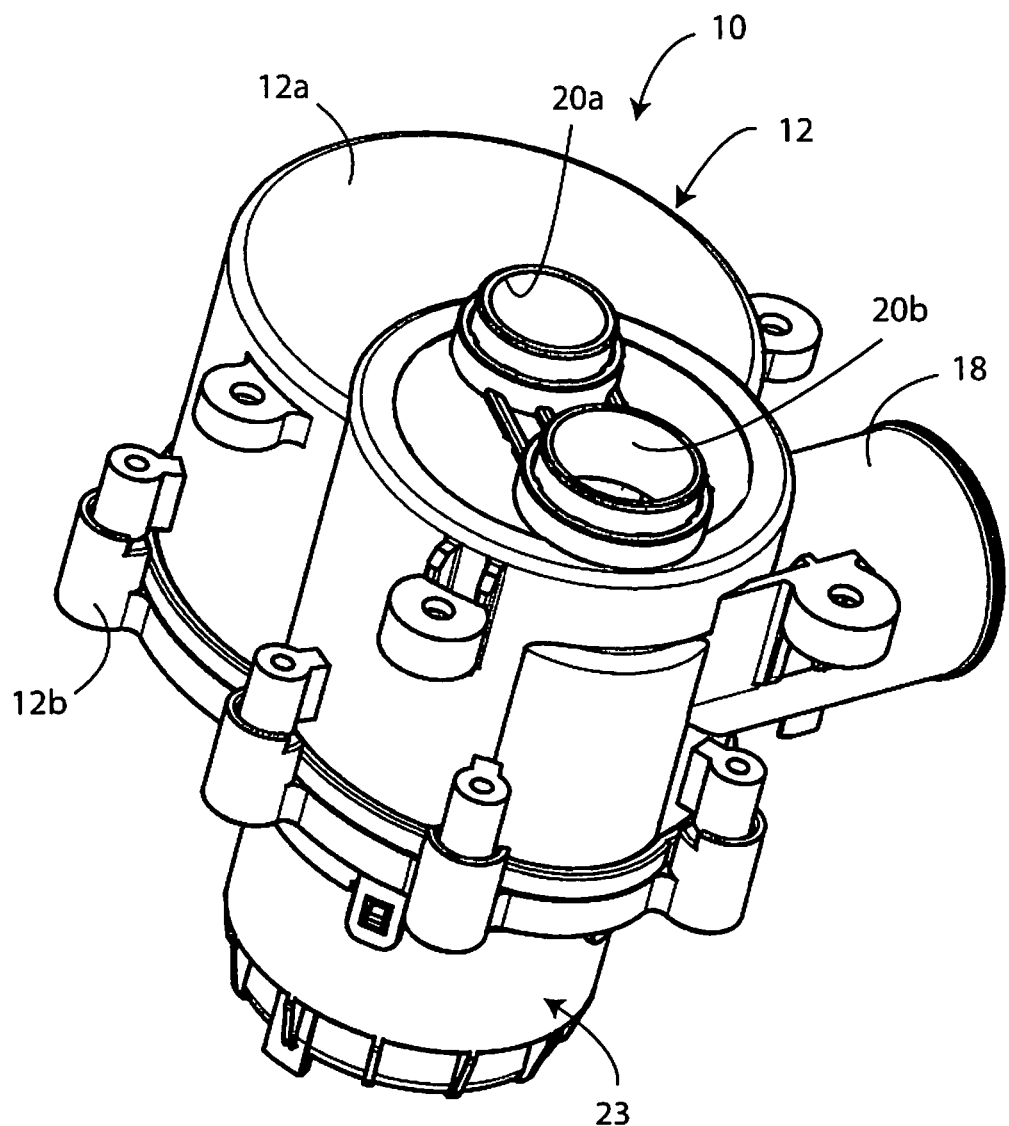
FIGS. 1 and 2 respectively are a prospective view and a plan view from the top of a diverter valve device manufactured according to an explanatory embodiment of the present invention.
Figure 2:
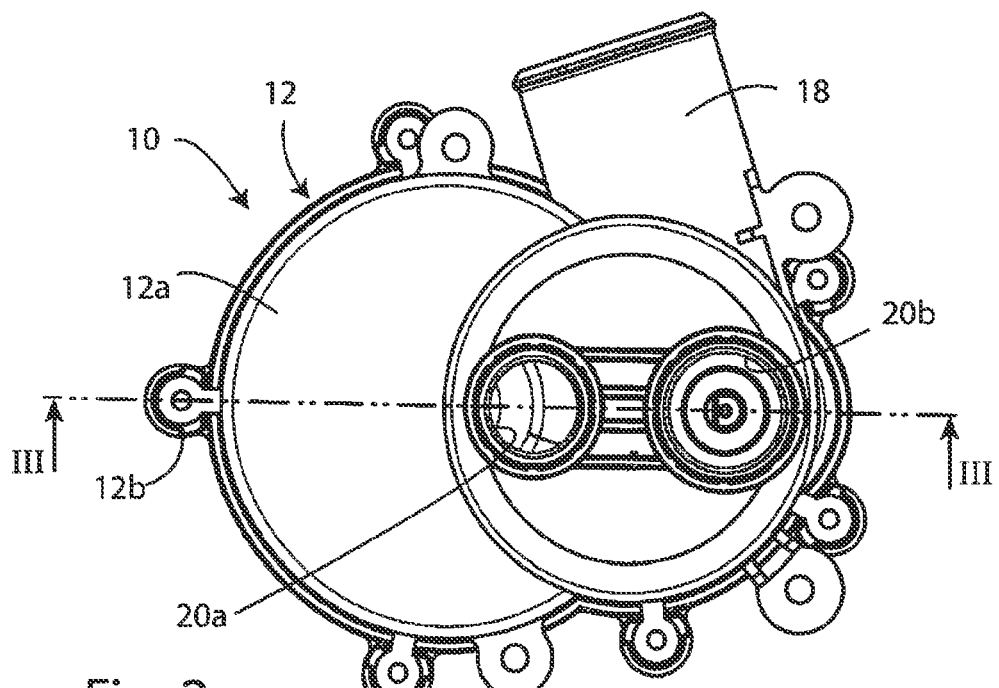
Figure 3:
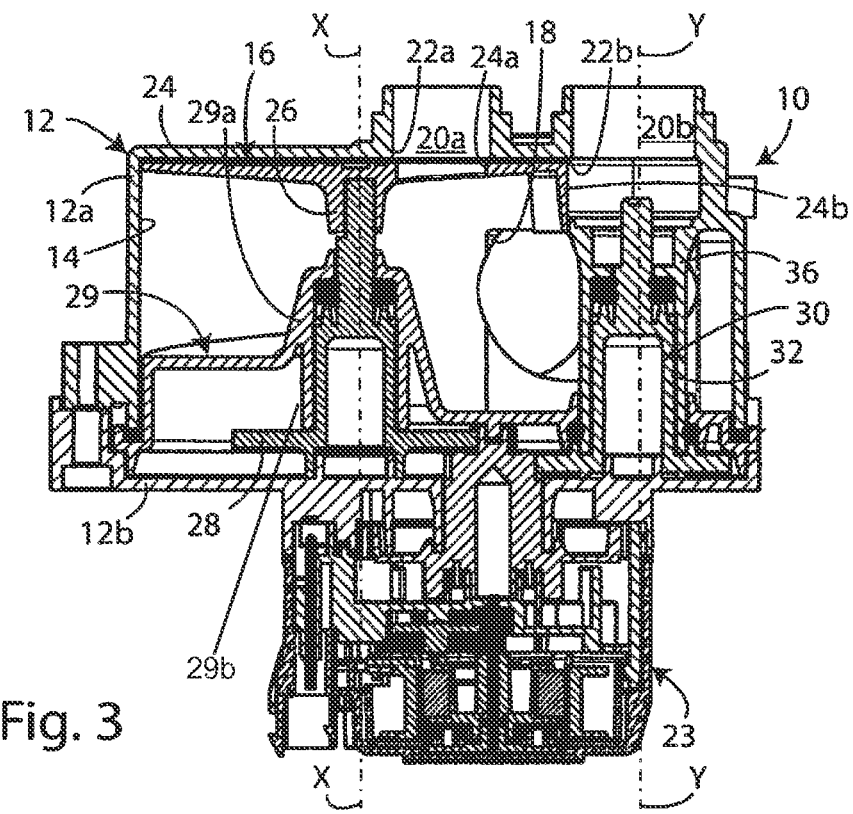
FIG. 3 is a cross-section view according to line III-III of FIG. 2.

With reference, in particular, to FIGS. 2 and 3, device 10 comprises:
- a valve body 12, in which a chamber 14 is defined, which is able to be flown through by a pressurized fluid flow;
- a rotatory plug 16, which is mounted on body 12 and is adapted to rotate about a rotation axis X-X (shown in FIG. 3);
- an inlet 18 for the fluid flow, which is provided in body 12 and is hydraulically arranged upstream of said chamber 14; and
- a pair of outlets 20a, 20b for the fluid flow, which stem from body 12, preferably in a substantially axial direction, and are hydraulically arranged downstream of chamber 14.

Body 12 has, furthermore, a substantially axial valve seat 22a and a substantially radial valve seat 22b, which are fluidly arranged between chamber 14 and one outlet 20a and the other outlet 20b, respectively. Plug 16 is suited to assume a first operating condition (shown in FIG. 3) and a second operating condition, in which it respectively frees and obstructs the substantially axial seat 22a as well as respectively obstructs and frees the substantially radial seat 22b.

Thanks to the features mentioned above, the structure of device 10 is particularly reliable and takes up a small place.

In particular, body 12 comprises a first portion, for example a hollow cup-shaped half-shell 12a, which is coupled in a fluid-tight manner to a second portion, for example a lid 12b, said cavity 14 being defined between the two portions.

Preferably, inlet 18 leads into chamber 14 in a substantially tangential direction, in particular laterally through the first portion or half-shell 12a.

In this embodiment, outlets 20a, 20b stem from the bottom of the first portion or half-shell 12a. In particular, outlets 20a, 20b both lie on the same side relative to said rotation axis X-X. In this embodiment, outlet 20a is arranged in a radially inner position, whereas outlet 20b is arranged in a radially outer position relative to rotation axis X-X.

Preferably, the axes of outlets 20a, 20b are substantially parallel to one another and, more preferably, even relative to rotation axis X-X. Though, in further embodiments, the axes of outlets 20a, 20b can also be oriented in a different fashion, for example they can be slightly divergent from one another and, if necessary, even relative to rotation axis X-X.

In this embodiment, the first outlet 20a can be fluidly connected to a first user circuit, for example the hydraulic circuit used to supply a pressurized liquid flow to an upper washing impeller of a dishwasher. Similarly, the second outlet 20b can be fluidly connected to a second user circuit, for example the hydraulic circuit used to supply a pressurized liquid flow to the lower washing impeller (indicated with number 34 in FIG. 6).

In particular, device 10 comprises, furthermore, actuator means 23, adapted to control the rotation of plug 16 between said operating conditions based on predetermined criteria. More in detail, actuator means 23 comprise a known electric motor (not numbered) and, preferably, a reduction gear assembly (not numbered), for example a known gear, which cooperates with the electric motor and is adapted to control the rotation of plug 16. In this embodiment, actuator means 23 are housed in a cartridge or casing, which is mounted and housed through said lid 12b. In this embodiment, actuator means 23 comprise, furthermore, a reduction gear assembly (not numbered), such as a gear, which is operated by said electric motor and controls the rotation of actuator 16.

Advantageously but not necessarily, the electric motor is of the so-called brushless type.

Figure 4:
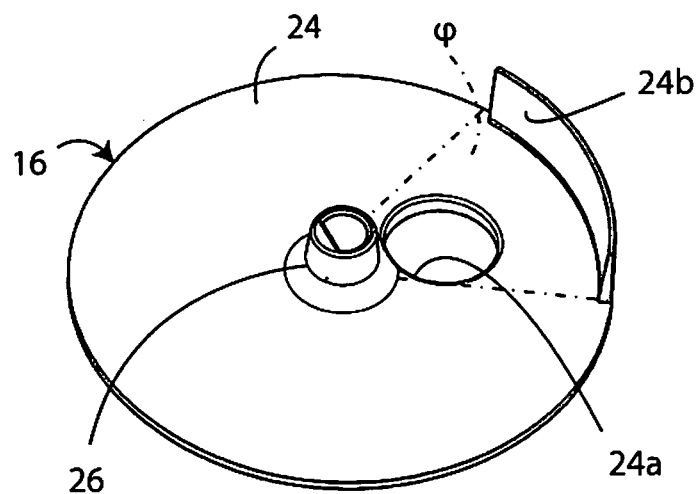
FIGS. 4 and 5 respectively are a prospective view from the top and a prospective view from the bottom of a plug provided by the valve device shown in the previous figures.
Figure 5:
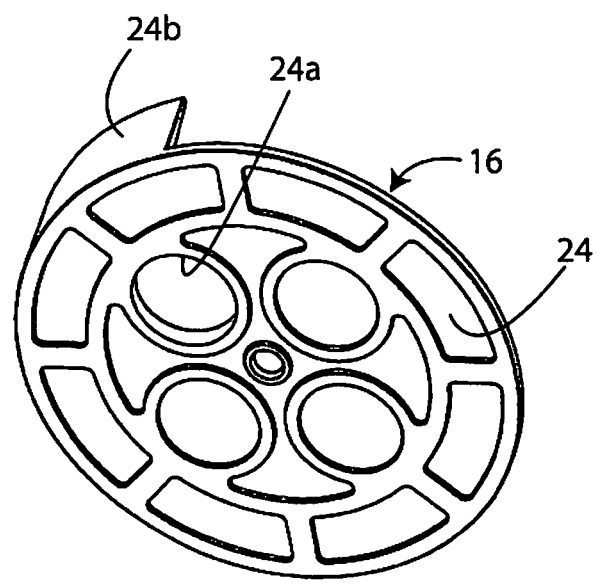

With reference, in particular, to FIGS. 3-5, plug 16 preferably comprises an obstructing portion 24, which has projecting part 24b, which substantially projects in an axial direction and is adapted to close and free said substantially radial seat 22b, when plug 16 respectively is in the first operating condition (FIG. 3) and in the second operating condition.

In this embodiment, projecting part 24b is peripherally supported by obstructing portion 24.

Preferably, said projecting part 24b defines a curved wall, which is supported by obstructing portion 24 and is adapted to be arranged on top of the substantially radial seat 22b, when the plug is in the first operating condition.

In this embodiment, obstructing portion 24 has a substantially axial opening 24a, which is eccentric relative to rotation axis X-X and is adapted to free the substantially axial seat 22a, when plug 16 is in the first operating condition. On the other hand, when the plug is in the second operating condition, opening 24a is misaligned relative to the substantially axial seat 22a, so that a solid region of obstructing portion 24 faces and obstructs the substantially axial seat 22a, thus preventing fluid from flowing through it.

Preferably, opening 24a is arranged on obstructing portion 24 in a position that is angularly delimited by projecting part 24b. In particular, opening 24a is substantially comprised in circular sector φ defined by projecting part 24b on obstructing portion 24 (to this regard, for the sake of clarity, see the dash-dot lines in FIG. 4).

By way of example, opening 24a has a substantially circular cross-section.

In this embodiment, the substantially axial valve seat 22a is made of a hole having a shape that substantially matches opening 24a. In particular, this hole leads into the first outlet 20a, which, in turn, has a cross-section that substantially matches that of the hole.

In this embodiment, obstructing portion 24 substantially has the shape of a plate, in particular a disc-shaped plate, for example with a substantially circular shape.

In particular, plug 16 comprises a hub portion 26, around which obstructing portion 24 radially develops and which is mechanically associated with actuator means 23, preferably through the reduction gear assembly. For example, hub portion 26 is splined to a shaft or rod 28, which is supported, so as to rotate, by body 12, in particular by the second portion or lid 12b, and is controlled, during the rotation, by actuator means 23, in particular through the reduction gear assembly.

With reference, in particular, to FIG. 3, in this embodiment actuator means 23 are separated, in a fluid-tight manner, from chamber 14 by an intermediated shaped partition 29, which is arranged on—and is crossed by—shaft or rod 28 and is suitably mounted in body 12. In particular, partition 29 is locked in a fluid-tight manner, in correspondence to its periphery, between the mouth of the first portion or half-shell 12a and the second portion or lid 12b.

Advantageously but not necessarily, a sealing gasket (not numbered) is interposed in an annular manner between partition 29 and the distal end of shaft or rod 28. In particular, the distal end of shaft or rod 28 extends, with a finger shape, through chamber 14 and is splined to hub portion 26 of plug 16.

Preferably, partition 29 is shaped so as to provide a dome formation 29a, through which shaft or rod 28 is mounted so as to be guided during the rotation. In particular, the sealing gasket mentioned above is arranged between the top of dome formation 29a and the distal end of shaft or rod 28. In this embodiment, a tubular body 29b is defined within dome formation 29a, said tubular body 29b being run through by shaft or rod 28, which is housed therein a guided during the rotation.

In this embodiment, shaft or rod 28 is adapted to rotate around rotation axis X-X, concentrically with plug 16.

Preferably, device 10 comprises, furthermore, transmission means 30, which cooperate with actuator means 23, in particular with said reduction gear assembly, and are adapted to axially transfer a mechanical power through the second outlet 20b in a substantially axial direction. For example, the transmission means comprise a shaft or rod 32, which is supported, so as to rotate, by body 12, in particular by the second portion or lid 12b, and is controlled, during the rotation, by actuator means 23, in particular through the reduction gear assembly.

In this embodiment, shaft or rod 32 (with a portion that extends, to a limited extent, only in an axial direction and is shown in FIG. 3) projects through the second outlet 20b and is adapted to transmit a torque to the outside of device 10.

Preferably, shaft or rod 32 can rotate around a rotation axis Y-Y (shown in FIG. 3), which is substantially parallel to rotation axis X-X of shaft or rod 28 associated with plug 16.

Figure 6:
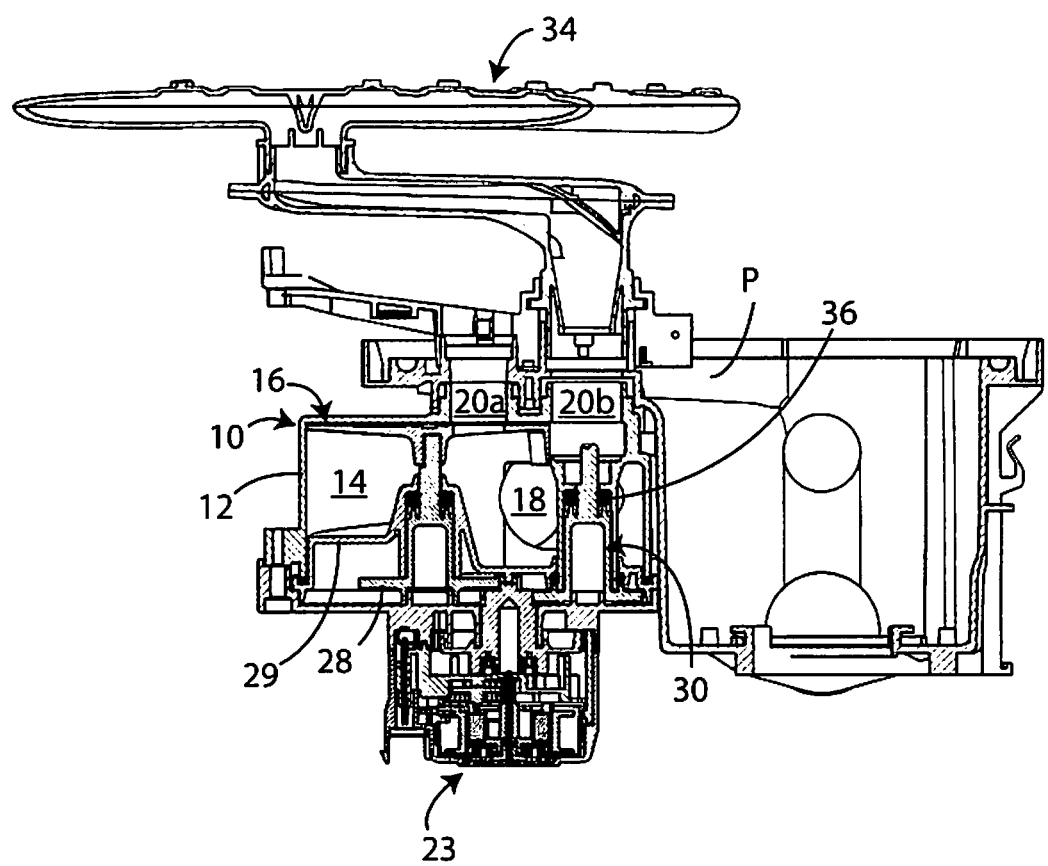
FIG. 6 is a cross-section view of the device shown in the previous figures, which is assembled in the sump of a dishwasher and is mechanically connected to a lower impeller of said machine.

With reference, in particular, to FIG. 6, shaft or rod 32 can preferably be constrained, so as to rotate, to an impeller 34, which is mounted in a dishwasher with freedom to rotate, for example in correspondence to sump P. This assembly allows the rotation of impeller 34 to be controlled through the same actuator means 23 that control the rotation of plug 16 between the different operating conditions. In other words, the second outlet 20b is hydraulically connected to impeller 34, so as to deliver to the latter the above-mentioned fluid flow, when plug 16 is in the second operating condition; at the same time, impeller 34 is constrained, during its rotation, to actuator means 23 through shaft or rod 32, which control its rotation in the tank or washing chamber obtained in the dishwasher.

In particular, shaft or rod 32 is housed, with freedom to rotate and in a fluid-tight fashion, in a tubular section 36 supported by half-shell 12a. For example, a further sealing gasket (not numbered) is interposed in an annular manner between tubular section 36 and the distal portion of shaft or rod 30.

In particular, tubular section 36 leads to the second outlet 20b, for example in a substantially axial direction.

In this embodiment, tubular section 36—when mounted—extends through partition 29, for example in a region thereof that is far from dome formation 29a. In particular, another sealing gasket (not numbered) is interposed in an annular manner in the portion in which tubular section 36 extends through partition 29.

Preferably, the substantially radial seat 22b is obtained laterally through said tubular section 36. In particular, the substantially radial seat 22b consists of a lateral recess of tubular section 36 supported by body 12, for example by the first portion or half-shell 12a. In particular, the substantially radial seat 22b has a substantially curved shape that is complementary to projecting part 24 that is adapted to obstruct and free it.

Therefore, in this embodiment, shaft or rod 32 extends through axial tubular section 36 and the second outlet 20b, so as not to interfere with the inflow of pressurized fluid controlled by the cooperation of plug 16, in particular of projecting part 24b, with the substantially radial seat 22b.

In this embodiment, device 10 is mechanically fixed to sump P of the dishwasher, for example by connecting sump P to body 12 in a known manner.

Naturally, the principle of the present invention being set forth, the embodiments and the implementation details can be widely changed with respect to what described above and shown in the drawings as a mere way of non-limiting example, without in this way going beyond the scope of protection provided by the accompanying claims.

For example, as an alternative to the embodiment shown, the plug can offer further operating configurations other than the ones shown. In particular, the plug can have further opening and/or closing projections in different angular positions on the obstructing portion; these further opening and/or closing projections can have shapes that, when they face the respective valve seats, allow them to choke the fluid flow through the outlets. This allows the valve seats to have configurations that are not limited to the ones of the "completely open" or completely closed" type, thus allowing the device to work in a flexible fashion and to adjust to different operating conditions.

The invention claimed is:

1. A diverter valve device for a washing machine, the diverter valve device comprising:
    a valve body, in which a chamber is defined, which is able to be passed through by a pressurized fluid flow;
    a rotatory plug, which is mounted on said body and is adapted to rotate about a rotation axis;
    at least one inlet for said fluid flow, which is provided in said body and is fluidly arranged upstream of said chamber; and
    at least one pair of outlets for said fluid flow, which exit from said body and are fluidly arranged downstream of said chamber;
    wherein said body has a substantially axial valve seat and a substantially radial valve seat fluidly arranged between said chamber and one of said outlets and respectively the other one of said outlets; said plug being arranged for assuming at least a first and a second operating condition, in which said plug frees and respectively obstructs said substantially axial valve seat as well as obstructs and respectively frees said substantially radial valve seat;
    actuating means for controlling rotation of said plug between said operating conditions;
    transmitting means for cooperating with said actuating means, said transmitting means being adapted to axially transfer a mechanical power through said other one of said outlets.

2. The device according to claim 1, wherein said plug comprises an obstructing portion having at least one projecting part, which substantially projects in an axial direction and adapted to close and free said substantially radial valve seat, when said plug is in said first operating condition and respectively in said second operating condition.

3. The device according to claim 2, wherein said at least one projecting part defines a curved wall, supported by said obstructing portion.

4. The device according to claim 2, wherein said obstructing portion has at least one substantially axial opening, eccentric with respect to said rotation axis and adapted to free said substantially axial seat, when said plug is in said first operating condition.

5. The device according to claim 4, wherein said at least one opening is arranged on said obstructing portion in a position that is angularly delimited by said projecting part.

6. The device according to claim 1, wherein said outlets exit from said body in a substantially axial direction.

7. The device according to claim 1, wherein said transmitting means comprise a shaft or rod, which axially extends through said other one of said outlets and which is adapted to be mechanically connected to a driven rotatory member.

8. The device according to claim 7, wherein said driven rotatory member is a lower sprayer rotor, adapted to be fluidly connected to said other one of said outlets.

9. A diverter valve device for a washing machine, the diverter valve device comprising:
    a valve body, in which a chamber is defined, which is able to be passed through by a pressurized fluid flow;
    a rotatory plug, which is mounted on said body and is adapted to rotate about a rotation axis;
    at least one inlet for said fluid flow, which is provided in said body and is fluidly arranged upstream of said chamber; and
    at least one pair of outlets for said fluid flow, which exit from said body and are fluidly arranged downstream of said chamber;
    wherein said body has a substantially axial valve seat and a substantially radial valve seat fluidly arranged between said chamber and one of said outlets and respectively the other one of said outlets; said plug being arranged for assuming at least a first operating condition and a second operating condition, in which said plug frees and respectively obstructs said substantially axial valve seat as well as obstructs and respectively frees said substantially radial valve seat;
    an actuator for controlling rotation of said plug between said operating conditions; and a transmitter cooperating with said actuator and adapted to axially transfer a mechanical power through said other one of said outlets.

10. The device according to claim 9, wherein said plug comprises an obstructing portion having at least one projecting part, which substantially projects in an axial direction and adapted to close and free said substantially radial valve seat, when said plug is in said first operating condition and respectively in said second operating condition.

11. The device according to claim 10, wherein said at least one projecting part defines a curved wall, supported by said obstructing portion.

12. The device according to claim 10, wherein said obstructing portion has at least one substantially axial opening, eccentric with respect to said rotation axis and adapted to free said substantially axial seat, when said plug is in said first operating condition.

13. The device according to claim 12, wherein said at least one opening is arranged on said obstructing portion in a position that is angularly delimited by said projecting part.

14. The device according to claim 9, wherein said outlets exit from said body in a substantially axial direction.

15. The device according to claim 9, wherein said transmitter comprises a shaft or rod, which axially extends through said other one of said outlets and which is adapted to be mechanically connected to a driven rotatory member.

16. The device according to claim 15, wherein said driven rotatory member is a lower sprayer rotor, adapted to be fluidly connected to said other one of said outlets.

* * * * *